United States Patent [19]

Obrecht et al.

[11] Patent Number: 4,954,585
[45] Date of Patent: Sep. 4, 1990

[54] PROCESS FOR THE PRODUCTION OF SULFUR-MODIFIED POLYCHLOROPRENE

[75] Inventors: Werner Obrecht, Moers; Peter Wendling, Leverkusen; Rüdiger Musch, Bergisch-Gladbach; Eberhard Müller, Dormagen, all of Fed. Rep. of Germany

[73] Assignee: Bayer Aktiengesellschaft, Leverkusen, Fed. Rep. of Germany

[21] Appl. No.: 289,816

[22] Filed: Dec. 27, 1988

[30] Foreign Application Priority Data

Jan. 8, 1988 [DE] Fed. Rep. of Germany ....... 3800263

[51] Int. Cl.$^5$ .......................... C08C 19/20; C08F 2/24
[52] U.S. Cl. .................................... 526/220; 526/222; 526/295
[58] Field of Search ....................... 526/204, 220, 222; 525/330.9

[56] References Cited

U.S. PATENT DOCUMENTS 4,061,850 12/1977 Edmondson ........................ 526/220
4,814,401 3/1989 Obrecht ............................. 526/204

FOREIGN PATENT DOCUMENTS 3507825 9/1986 Fed. Rep. of Germany .

Primary Examiner—Christopher Henderson
Attorney, Agent, or Firm—Connolly and Hutz

[57] ABSTRACT

The combination of unmodified resinic acids and direct peptization in the production of sulfur-modified polychloroprene leads to a favorable ratio of elasticity to viscosity.

7 Claims, No Drawings

PROCESS FOR THE PRODUCTION OF SULFUR-MODIFIED POLYCHLOROPRENE

This invention relates to a process for the production of soluble, sulfur-modified polychloroprene by emulsion polymerization using the "direct peptization" method in the presence of unmodified resinic acid.

Sulfur-modified polychloroprene has a number of commercially interesting properties and, accordingly, is used for a wide variety of applications. Sulfur-modified polychloroprene is characterized by the possibility of normal vulcanization with metal oxides, such as zinc oxide and/or magnesium oxide, without any need for vulcanization accelerators such as, for example, ethylenethiourea or 3-methyl thiazolidine-2-thione.

The vulcanizates of sulfur-modified polychloroprene are distinguished by high strength and tear propagation resistance for relatively high modulus values. Of particular advantage is their ability to withstand high dynamic stressing for high modulus values. Because of this, sulfur-modified polychloroprene is used above all for the production of dynamically stressed articles, for example V-belts, gear. belts and axle sleeves.

The production of polychloroprene has been known for some time and is carried out by emulsion polymerization in an alkaline aqueous medium; cf. "Ullmanns Encyclopädie der Technischen Chemie", Vol. 9, pages 366 et seq., Verlag Urban und Schwarzenberg, München-Berlin 1957; "Encyclopedia of Polymer Science and Technology", Vol. 3, pages 705 to 730, John Wiley, New York 1965; "Methoden der Organischen Chemie" (Houben-Weyl) XIV/1, 738 et seq., Georg Thieme Verlag, Stuttgart 1961.

Block polymers containing chloroprene and sulfur segments of different length are formed by copolymerization of the sulfur used. This copolymer initially formed is at least partly crosslinked and, accordingly, may be completely or partly insoluble in organic solvents, such as toluene. The product may be degraded to the desired viscosity by cleavage of the sulfur segments ("peptization") and is then soluble in toluene again. In most processes, peptization is carried out on completion of polymerization, although peptization during polymerization, which avoids a separate process step after polymerization, has also been recommended ("direct peptization", DE-OS 35 07 825).

The emulsifiers used are, in principle, any compounds and mixtures thereof which adequately stabilize the emulsion, including for example the water-soluble salts, particularly the sodium, potassium and ammonium salts, of long-chain fatty acids, colophony and colophony derivatives (i.e. unmodified and modified resinic acids), relatively high molecular weight alcohol sulfates, aryl sulfonic acids, formaldehyde condensates of aryl sulfonic acids, nonionic emulsifiers based on polyethylene oxide and polypropylene oxide and also emulsifying polymers such as polyvinyl alcohol (DE-OSS 23 07 811, 24 26 012, 25 14 666, 25 27 320, 27 55 074, 32 46 748, DE-AS 12 71 405, 13 01 502, US-P 2,234,215, JP-A-60-31 510 (=58-136 824 of 28.7 1983)).

Unmodified resinic acids are tricyclic diterpene carboxylic acids obtained from tall oil, pine balsam and root resin. Modified resinic acids are understood to be disproportionated and/or partially hydrogenated and/or polymerized resinic acids; cf. W. Barendrecht, L. T. Lees in Ullmanns Encyclopädie der Technischen Chemie, 4th Edition, Vol. 12, 528–538, Verlag Chemie, Weinheim—New York 1976. Unmodified resinic acids generally reduce the polymerization velocity in the synthesis of rubber (Plaste und Kautschuk 31, Number 3/1984, pages 90 et seq.).

It has now surprisingly been found that the combination of two process parameters which have been regarded as apparently independent of one another, namely the use of unmodified resinic acids on the one hand and the variant of direct peptization on the other hand, produce a synergistic effect in regard to the ratio of elasticity to viscosity. This result is totally unexpected and has not hitherto been explained.

The present invention relates to a process for the production of toluene-soluble, vulcanizable polychloroprene by emulsion polymerization of chloroprene and, based on polymerizable monomer used, 0 to 30% by weight and preferably 0 to 20% by weight of ethylenically unsaturated, other monomers copolymerizable with chloroprene in the presence of 0.05 to 1.5% by weight and preferably 0.1 to 1% by weight, based on polymerizable monomer used, of elemental sulfur or the equivalent quantity of sulfur donor by the variant of direct peptization, characterized in that the polymerization is carried out in alkaline medium in the presence of
(1)—based in each case on 100 g polymerizable monomer used—as peptizing agent
  (1a) $2 \times 10^{-4}$ to $4.4 \times 10^{-2}$ and preferably $4 \times 10^{-4}$ to $2 \times 10^{-2}$ mol dithiocarbamate containing the anion

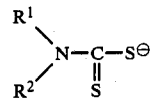

and/or
  (1b) $3 \times 10^{-4}$ to $6.4 \times 10^{-2}$ and preferably $6 \times 10^{-4}$ to $3 \times 10^{-2}$ mol xanthogenate containing the anion

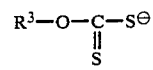

in which $R^1$, $R^2$ and $R^3$ represent $C_1$–$C_{24}$ alkyl, $C_5$–$C_{16}$ cycloalkyl or $C_5$–$C_{18}$ aryl which may contain up to three heteroatoms, in addition to which $R^1$ and $R^2$ together represent $C_4$–$C_5$ alkylene, and
(2) a water-soluble salt of tricyclic diterpene carboxylic acid containing at least two conjugated C=C double bonds per molecule in a quantity corresponding to $10^{-3}$ to $10^{-1}$ and preferably $6 \times 10^{-3}$ to $6 \times 10^{-2}$ C=C double bonds per 100 g polymerizable monomer used.

In the context of the invention, "toluene-soluble" means that no more than 5% by weight, based on a weighed sample of polymer, of insoluble residue remain at 25° C. (allow 150 mg sample to stand in 20 ml toluene for 16 hours, then shake for 2 hours, centrifuge, and dry at 70° C. to constant weight).

The sulfur-modified polychloroprene obtainable in accordance with the invention generally has a viscosity of at least 30,000 cP (Brookfield viscosimeter, 21° C.) and a Mooney viscosity (according to DIN 53 523) of up to 140 MU (ML 1+4; 100° C.) and preferably in the range from 20 to 120 MU.

Preferred ethylenically unsaturated "other monomers" copolymerizable with chloroprene include compounds containing 3 to 12 C atoms and 1 or 2 copolymerizable C=C double bonds per molecule. Examples of preferred "other monomers" are styrene, 2,3-dichlorobutadiene, 1-chlorobutadiene, butadiene, isoprene, acrylic acid, methacrylic acid, acrylonitrile and methacrylonitrile. The most important comonomer is 2,3-dichlorobutadiene.

Sulfur, which does not fall within the definition of the "other monomers" in the context of the invention, is preferably introduced into the reaction in aqueous dispersion. Suitable "sulfur donors" are known in principle from the vulcanization field; preferred sulfur donors contain sulfur segments with at least 3 connected sulfur atoms per molecule. Examples of such sulfur donors are tetraalkyl thiuram polysulfides.

The peptizing agents (1) are added to the polymerization mixture before the beginning of the reaction.

Preferably, $R^1$ and $R^2$ independently of one another represent $C_1$–$C_4$ alkyl while $R^3$ represents $C_1$–$C_8$ alkyl or 2,2-(2,4-dioxapentamethylene)-n-butyl corresponding to the following formula

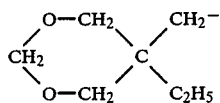

Preferred heteroatoms for the substituents $R^1$ to $R^3$ are nitrogen and oxygen.

Preferred cations for the compounds (1a) and (1b) are alkali metal ions, particularly sodium and potassium ions, and also ammonium ions.

The tricyclic diterpene carboxylic acids to be used in accordance with the invention may be used in the form of the crude resinic acids providing they are free from distillable constituents of turpentine oil which have been found to have an inhibiting effect. If the tricyclic diterpene carboxylic acids are themselves readily obtainable, they may also be used in pure form. Suitable tricyclic diterpene carboxylic acids include, for example, abietic acid, palustrinic acid, neoabietic acid and levopimaric acid.

The tricyclic unsaturated diterpene carboxylic acids (2) with their conjugated double bonds may be determined from the mixture of resinic acids according to type and quantity by gas chromatography; for example in accordance with or analogously to J. Amer. Oil Chem. Soc. 54, 289 (1977).

The claimed quantities correspond to 0.15 to 15 and preferably to 0.9 to 9% by weight (expressed as free acid) tricyclic diterpene carboxylic acid per 100 g polymerizable monomer.

The practice occasionally recommended in the prior art of using emulsifier mixtures in individual cases may also be applied in the present case. Thus, in addition to the unmodified tricyclic diterpene carboxylic acids, it is also possible to use other emulsifiers, such as anionic, cationic, amphoteric and nonionic emulsifiers, for example even modified resinic acids. It has proved to be of particular advantage to use sulfates or sulfonates, for example bis-(naphthalenesulfonate)-methane, in quantities which prevent premature coagulation when the latex is sensitized by acidification.

The emulsifiers to be used in accordance with the invention may be added to the monomers—preferably as free acid—or may be dissolved as acid or in the form of their salts in the aqueous phase. Preferred activators are water-soluble salts of peroxodisulfuric acid, such as potassium peroxodisulfate, used in quantities of 0.1 to 3 mmol and preferably in quantities of 0.2 to 2.5 mmol per 100 g polymerizable monomer used.

Sodium anthraquinone-β-sulfonate may be used as coactivator in quantities of up to 0.2% by weight and preferably in quantities of 0.005 to 0.1% by weight, based on the polymerizable monomer used.

The emulsion polymerization is generally carried out at pH values in the range from 3 to 14 and preferably in the range from 10 to 13.

The polymerization may be carried out at temperatures of 0 to 70° C. and preferably at temperatures of 5 to 50° C. After a conversion of 50 to 95% by weight and preferably of 60 to 90% by weight, the polymerization may be terminated by the addition of inhibitors.

The removal of residual monomer and working up may be carried out in the usual way.

The process according to the invention may be carried out continuously or non-continuously.

To improve stability in storage, it is possible to add stabilizers, such as sterically hindered phenols, amines, phosphites, xanthogene disulfides or thiuram disulfides. The preferred stabilizer is tetraethyl thiuram disulfide used in quantities of up to 6% by weight, based on polymerizable monomer used.

The sulfur-modified polychloroprenes produced in accordance with the invention may be vulcanized in the presence of vulcanization accelerators from the class of zinc and/or magnesium oxides, optionally after addition of fillers and, optionally, other additives, at elevated temperature and preferably at temperatures in the range from 100 to 250° C.

In the following Examples, parts are parts by weight and percentages percentages by weight.

EXAMPLES

The Examples according to the invention are based on tests carried out non-continuously on the basis of the following formulation:

|  | [Parts] |
|---|---|
| Chloroprene and comonomer | 100 |
| Deionized water | 120 |
| Tricyclic diterpene carboxylic acid | see text and tables |
| Na salt of the condensation product of 2 mol naphthalene sulfonic acid and 1 mol formaldehyde | 0.7 |
| Potassium hydroxide | 1.1 |
| Na salt of anthraquinone-β-sulfonic acid | 0.03 |
| Potassium peroxodisulfate | see Tables |
| Peptizing agent | see Tables |

EXAMPLE 1a

The aqueous phase consisting of 120 parts deionized water, 3.25 parts unmodified resinic acid based on root resin, 1.1parts potassium hydroxide, 0.7 part of the Na salt of the condensation product of naphthalenesulfonic acid and formaldehyde and 0.03 part of the Na salt of anthraquinone-β-sulfonic acid was introduced into a 20 liter flask, purged with nitrogen and heated to 40° C. 100 Parts nitrogen-purged chloroprene were then added. After a temperature of 40° C. had been adjusted, 0.3 part sulfur (50% aqueous dispersion) was added. 0.8 Part Na diethyl dithiocarbamate (30% aqueous solution) was then added.

The polymerization was activated with 0.03 part $K_2S_2O_8$ in the form of a nitrogen-purged 4% aqueous $K_2S_2O_8$ solution. During the test, $2.25 \times 10^{-3}$ parts $K_2S_2O_8$ per minute were added in the form of this aqueous nitrogen-purged persulfate solution.

The course of the polymerization was followed gravimetrically using weighed samples. The polymerization was stopped at a monomer conversion of 65% by addition of 0.03 part, based on latex, of a 2.5% solution of diethyl hydroxy lamine, after which 1.0 part tetraethyl thiuram disulfide (TETD) was added to the latex (toluene-soluble emulsion).

The latex was degassed to approx. 500 ppm residual chloroprene (based on latex), the degassed latex was adjusted to pH 6 with 20% acetic acid, the polymer was isolated by low-temperature coagulation, washed with deionized water and dried to a residual moisture content of $\leq 0.5\%$. The polymer had a Mooney viscosity (ML 1+4, 100° C.) of 51MU.

EXAMPLE 1b

The procedure was as in Example 1a, except that 0.9 part Na dibutyl dithiocarbamate was used instead of 0.8 part Na diethyl dithiocarbamate. The monomer conversion amounted to 66%. The polymer had a Mooney viscosity (ML 1+4, 100° C.) of 47 MU.

EXAMPLE 1c

The procedure was as in Example 1a, except that 1.2 parts Na dicyclohexyl dithiocarbamate were used instead of 0.8 part Na diethyl dithiocarbamate and the resinic acid based on root resin was replaced by the same quantity of an unmodified resinic acid based on tall oil. The monomer conversion was 70%. The polymer had a Mooney viscosity (ML 1+4, 100° C.) of 52 MU.

EXAMPLE 1d

The procedure was as in Example 1a, except that 1.5 parts K ethyl xanthogenate were used instead of 0.8 part Na diethyl dithiocarbamate and the resinic acid based on root resin was replaced by 3.25 parts of an unmodified resinic acid based on tall oil. The monomer conversion was 70%. The polymer had a Mooney viscosity (ML 1+4, 100° C.) of 40 MU.

EXAMPLE 1e

The procedure was as in Example 1a, except that 2.5 parts Na-2,2-(2,4-dioxapentamethylene)-n-butyl xanthogenate were used instead of 0.8 part Na diethyl dithiocarbamate and the resinic acid based on root resin was replaced by 3.25 parts of an unmodified resinic acid based on pine balsam. The monomer conversion amounted to 64%. The polymer had a Mooney viscosity (ML 1+4, 100° C.) of 55 MU.

The key differences in the formulations and the viscosities obtained are shown in Table 1 below (Examples 1a to 1e).

TABLE 1

Production conditions and viscosities for Examples 1a–1e

| | Unmodified resinic acid based on | Peptizing agent type | Quantity [parts] | $K_2S_2O_8$ [parts] | Monomer conversion [%] | TETD addition [parts] | ML 1 + 4 [MU] |
|---|---|---|---|---|---|---|---|
| Example 1a | root resin | Na diethyl dithiocarbamate | 0.8 | 0.30 | 65 | 1.0 | 51 |
| Example 1b | root resin | Na dibutyl dithiocarbamate | 0.9 | 0.15 | 66 | 1.0 | 47 |
| Example 1c | tall oil | Na dicyclohexyl dithiocarbamate | 1.2 | 0.25 | 70 | 1.0 | 52 |
| Example 1d | tallo oil | K-ethyl xanthogenate | 1.5 | 0.15 | 70 | 1.0 | 40 |
| Example 1e | pine balsam | Na-2,2-(2,4-dioxapentamethylene)-n-butyl xanthogenate | 2.5 | 0.30 | 64 | 2.0 | 55 |

EXAMPLE 2

The procedure was as in Example 1a except that the polymerization was activated with 0.005 part $K_2S_2O_8$ $1.0 \times 10^{-3}$ parts $K_2S_2O_8$ per minute were added during the test. 0.85 Part Na dibutyl dithiocarbamate and 3.25 parts of an unmodified resinic acid based on tall oil were used. The monomer conversion amounted to 64%. The quantity of TETD used amounted to 1.2 parts. The polymer had a Mooney viscosity (ML 1+4, 100° C.) of 42 MU.

EXAMPLE 3

Production was carried out as in Example 1a while activation was carried out as in Example 2. In contrast to Example 1a, 90 parts chloroprene, 10 parts 2,3-dichlorobutadiene, 1.2 parts Na dibutyl dithiocarbamate and 3.25 parts of an unmodified resinic acid based on tall oil were used and the polymerization was carried out at a temperature of 25° C. The monomer conversion amounted to 67%. The quantity of TETD used amounted to 1.5 parts. The polymer had a Mooney viscosity (ML 1+4, 100° C.) of 41 MU.

EXAMPLE 4

Production was carried out as in Example 1a while activation was carried out as in Example 2. In contrast to Example 1a, 0.85 part Na dibutyl dithiocarbamate was used and the unmodified resinic acid was dissolved in the monomer. The monomer conversion amounted to 65%. The quantity of TETD used amounted to 1.2 parts. The polymer had a Mooney viscosity (ML 1+4, 100° C.) of 38 MU.

EXAMPLE 5

Production was carried out as in Example 1a while activation was carried out as in Example 2. In contrast to Example 1a, 3.25 parts of an unmodified resinic acid based on pine balsam was used. In addition, 0.85 part Na dibutyl dithiocarbamate was used. The monomer conversion amounted to 65% and the quantity of TETD used to 1.5 parts. The polymer had a Mooney viscosity (ML 1+4, 100° C.) of 36 MU.

EXAMPLE 6

Production was carried out as in Example 1a while activation was carried out as in Example 2. In contrast to Example 1a, 1.95 parts unmodified resinic acid based on tall oil and 1.30 parts disproportionated resinic acid and also 0.85 parts Na dibutyl dithiocarbamate were used. The monomer conversion amounted to 66% and the quantity of TETD used to 1.5 parts. The polymer had a Mooney viscosity (ML 1+4, 100° C.) of 39 MU.

EXAMPLE 7

Production was carried out as in Example 1a while activation was carried out as in Example 2. In contrast to Example 1a, 1.63 parts unmodified resinic acid based on tall oil and 1.63 parts disproportionated abietic acid and also 0.85 part Na dibutyl dithiocarbamate were used. The monomer conversion amounted to 65% and the quantity of TETD used to 1.5 parts. The polymer had a Mooney viscosity (ML 1+4, 100° C.) of 36 MU.

EXAMPLE 8

Production was carried out as in Example 1a while activation was carried out as in Example 2. In contrast to Example 1a, 3.25 parts abietic acid and 0.85 part Na dibutyl dithiocarbamate were used. The monomer conversion amounted to 65% and the quantity of TETD used to 1.5 parts. The polymer had a Mooney viscosity (ML 1+4, 100° C.) of 40 MU.

EXAMPLE 9

Production was carried out as in Example 1a while activation was carried out as in Example 2. In contrast to Example 1a, 3.25 parts of an unmodified resinic acid based on tall oil dissolved in the monomer were used. In addition, 0.80 part Na dibutyl dithiocarbamate was used. The monomer conversion amounted to 68% and the quantity of TETD used to 1.5 parts. The polymer had a Mooney viscosity (ML 1+4, 100° C.) of 45 MU.

EXAMPLE 10

Production was carried out as in Example 1a while activation was carried out as in Example 2. In contrast to Example 1a, 3.25 parts abietic acid were used. In addition, 0.80 part Na dibutyl dithiocarbamate was used. The monomer conversion amounted to 65% and the quantity of TETD used to 1.2 parts. The polymer had a Mooney viscosity (ML 1+4, 100° C.) of 42 MU.

TABLE 2

Production conditions and viscosities for Examples 2 to 10

| | Unmodified resinic acids based on | Na dibutyl dithiocarbamate [parts] | Monomer CP [parts] | Monomer DCB [parts] | Temp. [°C.] | $K_2S_2O_8$ [parts] | Monomer conversion [%] | TETD addition [parts] | ML 1 + 4 [MU] |
|---|---|---|---|---|---|---|---|---|---|
| Example 2 | tall oil | 0.85 | 100 | — | 40 | 0.15 | 64 | 1.2 | 42 |
| Example 3 | tall oil | 0.85 | 90 | 10 | 25 | 0.20 | 67 | 1.5 | 41 |
| Example 4 | root resin | 0.85 | 100 | — | 40 | 0.46 | 65 | 1.2 | 38 |
| Example 5 | pine balsam | 0.85 | 100 | — | 40 | 0.13 | 65 | 1.5 | 36 |
| Example 6 | tall oil[1] | 0.85 | 100 | — | 40 | 0.19 | 66 | 1.5 | 39 |
| Example 7 | tall oil[2] | 0.85 | 100 | — | 40 | 0.21 | 65 | 1.5 | 36 |
| Example 8 | abietic acid | 0.85 | 100 | — | 40 | 0.23 | 65 | 1.5 | 40 |
| Example 9 | tall oil | 0.80 | 100 | — | 40 | 0.25 | 68 | 1.5 | 45 |
| Example 10 | abietic acid | 0.80 | 100 | — | 40 | 0.26 | 65 | 1.2 | 42 |

[1] 60:40 mixture of unmodified resinic acid and disproportionated resinic acid
[2] 50:50 mixture of unmodified resinic acid and disproportionated resinic acid

COMPARISON EXAMPLE 1

A polychloroprene was prepared in accordance with DE-OS 27 55 074, polymer 3, using an unmodified resinic acid based on root resin. The polymerization conversion amounted to 68% and peptization was carried out after polymerization. The polymer had a Mooney viscosity ML 1+4 (100° C.) of 41 MU.

COMPARISON EXAMPLE 2

Disproportionated resinic acid was used in the polymerization in accordance with DE-OS 35 07 825, series 8, Example D. Peptization was carried out during polymerization. For reasons of comparison with the polymer prepared in accordance with the invention, Example 2, no dichlorobutadiene was used in Comparison Example 2. The polymerization conversion amounted to 65% while the Mooney viscosity ML 1+4 (100° C.) of the polymer was 43 MU.

COMPARISON EXAMPLE 3

The procedure was as in Comparison Example 1, except that disproportionated resinic acid was used. The conversion amounted to 64% and the Mooney viscosity ML 1+4 (100° C.) to 40 MU.

COMPARISON EXAMPLE 4

The procedure was as in Comparison Example 1, except that disproportionated resinic acid was used. The conversion amounted to 67% and the Mooney viscosity ML 1+4 (100° C.) to 45 MU.

COMPARISON EXAMPLE 5

The procedure was as in Comparison Example 1. The polymerization conversion amounted to 67% and the Mooney viscosity ML 1+4 (100° C.) to 43 MU.

The Mooney viscosity (ML 1+4) of the crude rubber obtained was measured in accordance with DIN 53 523, Part 1-3, at 100° C.; the viscosity number $V_{10}$ and the elasticity number $DE_{30}$ were also measured (see Table 3).

The measurement and significance of $V_{10}$ and $DE_{30}$ are explained in detail in Kautschuk, Gummi und Kunststoffe 36 (1983), no. 2, in the Article by R. Koopmann (Verfahren zur genauen und umfassenden rheolotischen Materialcharakter sierung [Methods for the Exact and Comprehensive Rheological Characterization of Materials]).

TABLE 3

Properties of the polymers of Examples 2 to 10 produced in accordance with the invention by comparison with the prior art

| Polymer | ML 1 + 4 [MU] | $V_{10}$ [Ns] | $DE_{30}$ [1/$_{10}$mm] | $\frac{DE_{30}}{V_{10}}$ [1/$_{10}$mm · Ns$^{-1}$] |
|---|---|---|---|---|
| Example 2 | 42 | 47.8 | 18.8 | 0.393 |
| Example 3 | 41 | 43.5 | 15.5 | 0.356 |
| Example 4 | 38 | 42.4 | 16.5 | 0.389 |
| Example 5 | 36 | 34.0 | 15.9 | 0.468 |
| Example 6 | 39 | 43.8 | 16.2 | 0.370 |
| Example 7 | 36 | 36.0 | 15.8 | 0.438 |
| Example 8 | 40 | 44.5 | 16.3 | 0.366 |
| Example 9 | 45 | 56.0 | 19.6 | 0.350 |
| Example 10 | 42 | 61.2 | 21.5 | 0.351 |
| Comparison Example 1 | 41 | 41.2 | 26.7 | 0.648 |
| Comparison Example 2 | 43 | 43.3 | 24.2 | 0.559 |
| Comparison Example 3 | 40 | 44.0 | 25.9 | 0.589 |
| Comparison Example 4 | 45 | 51.7 | 27.3 | 0.522 |
| Comparison Example 5 | 43 | 54.0 | 28.2 | 0.522 |

Examples 2 to 10 show that the polymers produced in accordance with the invention show improved properties in relation to the prior art (Comparison Examples 1 to 5). This is reflected in the quotient of elasticity $DE_{30}$ to viscosity number $V_{10}$.

A comparison of the individual data shows in particular the following surprising correlation:

1) The change from Comparison 3 (modified resinic acid, subsequent peptization) to Comparison 1 (unmodified resinic acid, subsequent peptization) produces a deterioration in the $DE_{30}/V_{10}$ value (the higher, the poorer the value).

2) The change from Comparison 3 (modified resinic acid, subsequent peptization) to Comparison 2 (modified resinic acid, direct peptization) produces a slight improvement in the $DE_{30}/V_{10}$ value.

3) It follows from 1) and 2) that the change from subsequent peptization/modified resinic acid to direct peptization/unmodified resinic acid produces a more than additive, i.e. synergistic, effect in regard to the $DE_{30}/V_{10}$ quotient: a pure addition would thus actually lead to a deterioration.

As shown in Table 3, however, the Examples according to the invention are far superior to the Comparison Examples in regard to $DE_{30}/V_{10}$.

We claim:

1. A process for the production of toluene-soluble vulcanizable polychloroprene by emulsion polymerization of chloroprene and, based on polymerizable monomer used, 0 to 30% by weight of ethylenically unsaturated monomers copolymerizable with chloroprene in the presence of 0.05 to 1.5% by weight, based on polymerizable monomer used, of elemental sulfur or the equivalent quantity of sulfur donor using the variant of direct peptization, characterized in that the polymerization is carried out in alkaline medium in the presence of
   (1)—based in each case on 100 g polymerizable monomer used—as peptizing agent
   (1a) $2 \times 10^{-4}$ to $4.4 \times 10^{-2}$ mol dithiocarbamate containing the anion

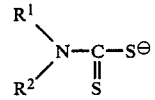

and/or
   (1b) $3 \times 10^{-4}$ to $6.2 \times 10^{-2}$ mol xanthogenate containing the anion

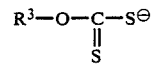

in which $R^1$, $R^2$ and $R^3$ represent $C_1$-$C_{24}$ alkyl, $C_5$-$C_{16}$ cycloalkyl or $C_5$-$C_{18}$ aryl, which may contain up to 3 heteroatoms, in addition to which $R^1$ and $R^2$ together represent $C_4$-$C_5$ alkylene and
   (2) 0.9 to 9% by weight on 100 g polymerizable monomer and expressed as free acid of a water-soluble salt of tricyclic diterpene carboxylic acid containing two conjugated C=C double bonds per molecule in a quantity corresponding to $10^{-3}$ to $10^{-1}$ C=C double bonds per 100 g polymerizable monomer used.

2. A process as claimed in claim 1, in which up to 20% by weight of other copolymerizable monomers are used in addition to chloroprene.

3. A process as claimed in claim 1, characterized in that it is carried out in the presence of 0.1 to 1% by weight elemental sulfur or the equivalent quantity of sulfur donor.

4. A process as claimed in claim 1, characterized in the it is carried out in the presence of $4 \times 10^{-4}$ to $2 \times 10^{-2}$ mol dithiocarbamate (1a).

5. A process as claimed in claim 1, characterized in that it is carried out in the presence of $6 \times 10^{-4}$ to $3 \times 10^{-2}$ mol xanthogenate (1b).

6. A process as claimed in claim 1, characterized in that it is carried out in the presence of a quantity of salt (2) corresponding to $6 \times 10^{-3}$ to $6 \times 10^{-2}$ C=C double bonds per 100 g polymerizable monomer used.

7. Process according to claim 1 wherein $R^1$, $R^2$ and $R^3$ of the peptizing agent is $C_5$-$C_{16}$ cycloalkyl or $C_5$-$C_{18}$ aryl containing up to three oxygen or nitrogen heteroatoms.

* * * * *